United States Patent
Agarwal et al.

(10) Patent No.: US 8,438,452 B2
(45) Date of Patent: May 7, 2013

(54) POISON BIT ERROR CHECKING CODE SCHEME

(75) Inventors: Rajat Agarwal, Beaverton, OR (US); Scott Huddleston, Beaverton, OR (US); Dennis Brzezinski, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 973 days.

(21) Appl. No.: 12/317,849

(22) Filed: Dec. 29, 2008

(65) Prior Publication Data

US 2010/0169739 A1 Jul. 1, 2010

(51) Int. Cl.
*G06F 11/00* (2006.01)
(52) U.S. Cl.
USPC .............................. 714/763; 714/765; 714/752
(58) Field of Classification Search .................. 714/758, 714/759, 768, 764, 765, 799, 766
See application file for complete search history.

(56) References Cited

U.S. PATENT DOCUMENTS

| | | | |
|---|---|---|---|
| 6,594,785 B1 * | 7/2003 | Gilbertson et al. | 714/48 |
| 6,622,268 B2 | 9/2003 | Holman | |
| 6,886,116 B1 | 4/2005 | MacLellan et al. | |
| 2003/0126409 A1 | 7/2003 | Juan et al. | |
| 2004/0163030 A1 * | 8/2004 | Haar et al. | 714/800 |
| 2004/0225932 A1 | 11/2004 | Hoda et al. | |
| 2005/0138487 A1 | 6/2005 | Vaid et al. | |
| 2006/0236213 A1 | 10/2006 | Honda et al. | |
| 2007/0050688 A1 * | 3/2007 | Thayer | 714/100 |
| 2008/0046792 A1 * | 2/2008 | Yamamoto et al. | 714/746 |
| 2008/0091884 A1 * | 4/2008 | Piry et al. | 711/141 |
| 2008/0168319 A1 * | 7/2008 | Lee et al. | 714/746 |
| 2009/0019306 A1 * | 1/2009 | Hum et al. | 714/2 |
| 2010/0005375 A1 * | 1/2010 | Dell et al. | 714/807 |

FOREIGN PATENT DOCUMENTS

| | | |
|---|---|---|
| JP | 2005-071224 A | 3/2005 |
| WO | 2008021693 A2 | 2/2008 |

OTHER PUBLICATIONS

International Search Report and Written Opinion Received for PCT Patent Application No. PCT/US2009/067530, mailed on Jul. 9, 2010, 9 pages.
International Preliminary Report on Patentability Received for PCT Patent Application No. PCT/US2009/067530, mailed on Jul. 7, 2011, 6 pages.
Office Action Received for European Patent Application No. 09836783.2, mailed on Aug. 5, 2011, 2 pages of Office Action.
Office Action Received for Korean Patent Application No. 2011-7007706, mailed on Jul. 31, 2012, 2 pages of only English Translation of Office Action.
Office Action Received for European Patent Application No. 09836783.2, mailed on Aug. 8, 2012, 6 pages of Office Action.
Search Report received for the European Patent Application No. 09836783.2, mailed on Jul. 27, 2012, 3 pages.

(Continued)

*Primary Examiner* — Scott Baderman
*Assistant Examiner* — Sarai Butler
(74) *Attorney, Agent, or Firm* — Caven & Aghevli LLC

(57) ABSTRACT

In one embodiment, a method provides determining one of an occurrence and a non-occurrence of an event, the one of the occurrence and the non-occurrence resulting in an event determination; and processing a code having an event bit, said processing in accordance with the determination and the code, by determining if the event bit corresponds to the event determination, and if the event bit does not correspond to the event determination, encoding the code to generate a poison bit that corresponds to the event determination.

20 Claims, 4 Drawing Sheets

OTHER PUBLICATIONS

Office Action Received for Japanese Patent Application No. 2011-535800, mailed on Oct. 30, 2012, 6 pages of Office Action and 8 pages of English Translation.

Office Action received for Korean Patent Application No. 2011-7007706, mailed on Feb. 28, 2013, 3 pages of English Translation of the Office Action.

* cited by examiner

POISON BIT ERROR CHECKING CODE SCHEME

FIELD

Embodiments of this invention relate to a poison bit error checking code scheme.

BACKGROUND

As data passes in and out of memory, various types of errors can occur. More commonly, they are single bit errors, but 2-bit, and other types of errors may also occur. Error checking is commonly used to check for the integrity of data as data is written to and read from memory. Error checking may comprise error detection and/or error correction. Error detection is the ability to detect the presence of errors caused by noise or other impairments during transmission. Error correction is the additional ability to reconstruct the original, error-free data. There are many schemes available.

Error correction code (ECC) is one example of an error checking scheme, specifically, error correction. In ECC, for example, as data is sent across a memory bus, ECC generation logic, e.g., an exclusive OR algorithm, is calculated over the data to generate an ECC. The data and ECC are then stored together in memory. When data is subsequently accessed (along with the ECC) from memory, ECC error decode logic is applied to the data to generate error detection and correction information. The data can then be corrected using this information.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples are described in detail, or where one or more examples are provided, it should be understood that the examples are not to be construed as exhaustive, and are not to be limited to embodiments of the invention to the examples described and/or illustrated.

Figure 1:
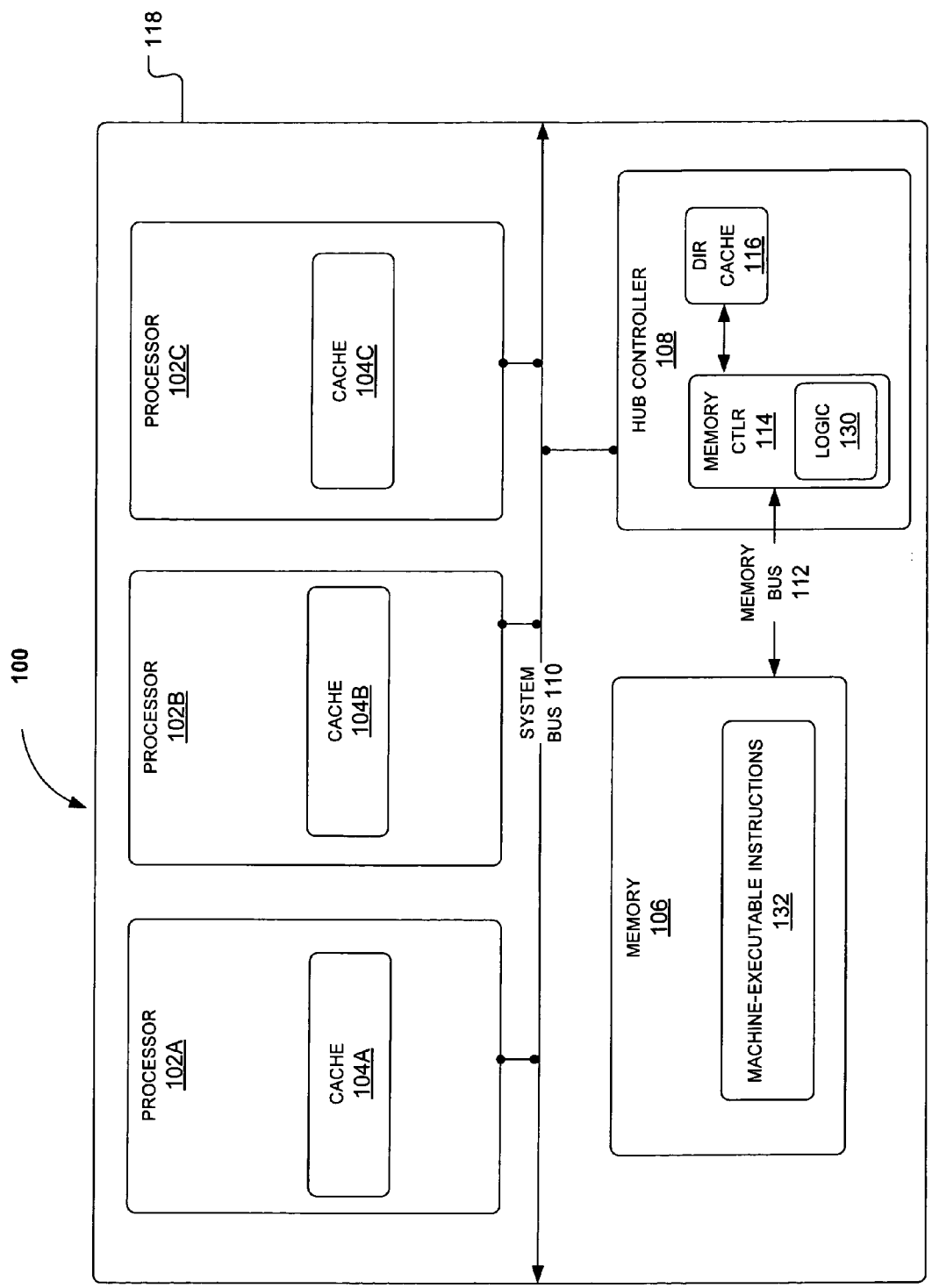
FIG. 1 illustrates a system in accordance with embodiments of the invention.

FIG. 1 is a block diagram that illustrates a computing system 100 according to an embodiment. In some embodiments, computing system 100 may comprise a plurality of processors 102A, 102B, 102C, up to N processors. As used herein, any given one of processors 102A, 102B, 102C may be referred to as 102N. A "processor" as discussed herein relates to any combination of hardware and software resources for accomplishing computational tasks. For example, a processor may comprise a central processing unit (CPU) or microcontroller to execute machine-readable instructions for processing data according to a predefined instruction set. A processor may comprise a multi-core processor having a plurality of processing cores, and a processor may alternatively refer to a processing core that may be comprised in the multi-core processor, where an operating system may perceive the processing core as a discrete processor with a full set of execution resources. Other possibilities exist.

System 100 may additionally comprise memory 106. Memory 106 may store machine-executable instructions 132 that are capable of being executed, and/or data capable of being accessed, operated upon, and/or manipulated. "Machine-executable" instructions as referred to herein relate to expressions which may be understood by one or more machines for performing one or more logical operations. For example, machine-executable instructions 132 may comprise instructions which are interpretable by a processor compiler for executing one or more operations on one or more data objects. However, this is merely an example of machine-executable instructions and embodiments of the present invention are not limited in this respect. Memory 106 may, for example, comprise read only, mass storage, random access memory, non-volatile memory, and/or one or more other types of machine-accessible memories. In a multi-processor system where memory is shared and synchronized using local caches 104A, 104B, 104C (caches local to the processors), data stored in the memory may be referred to as a cache line.

Logic 130 may be comprised on or within any part of system 100. Logic 130 may comprise hardware, software, or a combination of hardware and software (e.g., firmware). For example, logic 130 may comprise circuitry (i.e., one or more circuits), to perform operations described herein. For example, logic 130 may comprise one or more digital circuits, one or more analog circuits, one or more state machines, programmable logic, and/or one or more ASICs (Application-Specific Integrated Circuits). Logic 130 may be hard-wired to perform the one or more operations. Alternatively or additionally, logic 130 may be embodied in machine-executable instructions 132 stored in a memory, such as memory 106, to perform these operations. Alternatively or additionally, logic 130 may be embodied in firmware. Logic may be comprised in various components of system 100, such as in memory controller 114. Although logic 130 is illustrated as a discrete block in memory controller 114, it is understood by one of ordinary skill in the art that memory controller 114 and logic 130 may be otherwise comprised in the same block. Generally, logic 130 may be used to perform various functions by various components as described herein.

Hub controller 108 may comprise a host bridge/hub system that may couple each of processing cores 102A, 102B, 102C and memory 106 to each other. Hub controller 108 may comprise one or more integrated circuit chips, such as those selected from integrated circuit chipsets commercially available from Intel® Corporation (e.g., graphics, memory, and I/O controller hub chipsets), although other one or more integrated circuit chips may also, or alternatively, be used. For example, hub controller 108 may comprise an input/output control hub (ICH), a memory control hub (MCH), or a graphics/memory control hub (GMCH). System 100 may comprise two hub controllers such as an ICH and MCH, or just a single hub controller, although embodiments of the invention are not limited by the number of hub controllers in system 100.

Hub controller 108 may communicate with memory 106 via memory bus 112 and with processors 102A, 102B, 102C via system bus 110. Hub controller 108 may include memory controller 114 to manage the movement of data between processors 102A, 102B, 102C and memory 106 as well as other devices (not shown) in system 100. Alternatively memory controller 114 may be integrated on die with one or more of processors 102A, 102B, 102C.

System 100 may furthermore comprise a directory cache 116. Directory cache 116 may hold information about each block of memory, or cache line. For example, directory cache 116 may indicate a state of each block of memory, e.g., shared, uncached, or exclusive; which local caches (corresponding to one of processors 102A, 102B, 102C) have copies of a given cache line; and whether or not the cache line is dirty.

For example, in an embodiment, every request for data is sent to directory cache 116. Directory cache 116 may then forward the request for data to any number of processors 102A, 102B, 102C that directory cache 116 indicates has stored the data in its local cache. As an example, directory cache 116 may maintain an N-bit vector map for N nodes, where each bit indicates whether the corresponding node maintains a cached copy of a given cache line.

Processors 102A, 102B, 102C, memory 106, and busses 110, 112 may be comprised in a single circuit board, such as, for example, a system motherboard 118, but embodiments of the invention are not limited in this respect.

Figure 2:
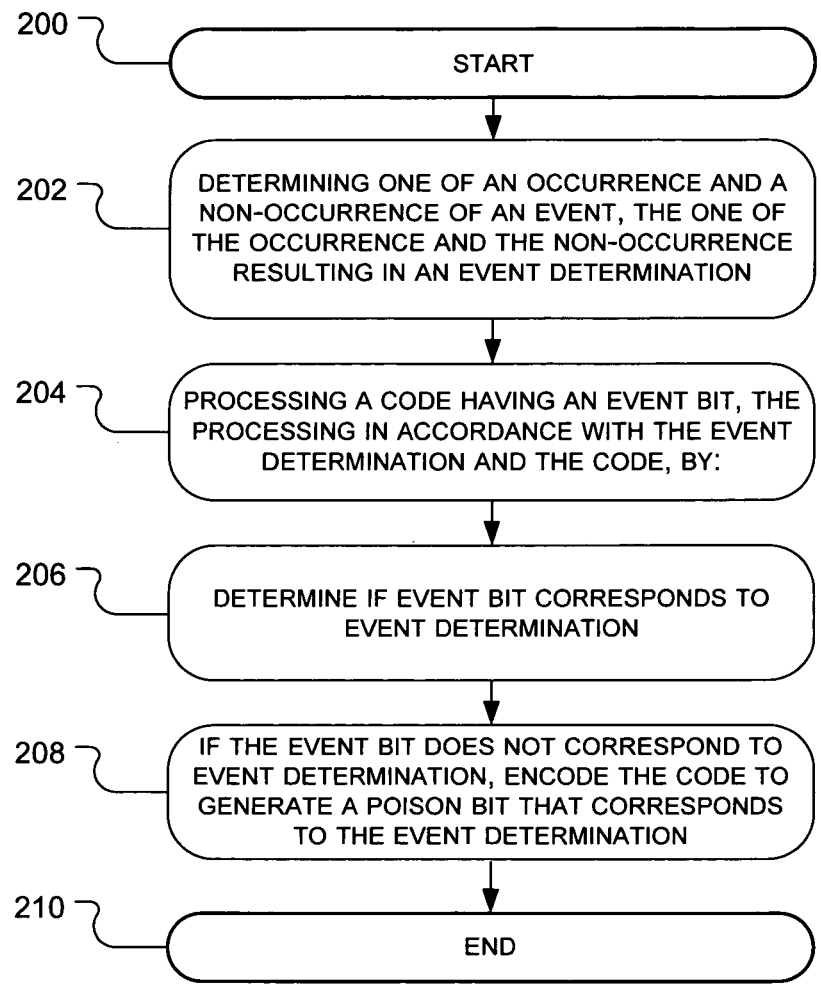
FIG. 2 illustrates a method according to an embodiment of the invention.

FIG. 2 illustrates a method in accordance with an embodiment of the invention. The method of FIG. 2 may begin at block 200 and continue to block 202 where the method may comprise determining one of an occurrence and a non-occurrence of an event, the one of the occurrence and the non-occurrence resulting in an event determination.

An event may comprise, for example, data being cached. For example, in an embodiment, processor 102N may modify data, cache it in its local cache, and then write the data back to memory, such as memory 106. In this example, an event may be determined to occur when data is stored in a local cache. As another example, an event may comprise a message being stored. For example, in certain systems, such as supercomputers, processes running on various microprocessors in the system may pass messages to each other. In this example, when one process generates and stores a message for another process, an event may be determined to occur.

At block 204, the method may comprise processing a code having an event bit, the processing in accordance with the event determination and the code. An "event bit" refers to a bit in a code that may be set to indicate the occurrence or non-occurrence of an event. The event bit may comprise a static bit position, e.g., bit position 0, or it may comprise a dynamic bit position, e.g., bit position 3 to indicate that a particular processor has generated an event. Thus, if it is determined that an event has occurred, the event bit is set to one value; otherwise, if it is determined that an event has not occurred, the event bit is set to a different value. "Set" may refer to setting a bit to "1" to indicate an occurrence of event, or "0" to indicate a non-occurrence of an event. Alternatively, "set" may refer to setting a bit to "0" to indicate an occurrence of event, or "1" to indicate a non-occurrence of an event.

In this context, "processing the code in accordance with the event determination and the code" refers to, at block 206, determining if the event bit of the code corresponds to the event determination; if it does not, the code is encoded, otherwise it is left alone. An event bit does not correspond to the event determination if the event bit contradicts the event determination. For example, if the event bit has a value of "0", where this value is configured to represent that the event is disabled, or has not occurred; and if it is determined that an event has occurred, then the event bit does not correspond to the event determination.

Conversely, an event bit corresponds to the event determination if the event bit indicates an occurrence of the event that does not contradict the event determination. For example, if the event bit has a value of "1", where this value is configured to represent that the event has occurred; and if it is determined that an event has occurred, then the event bit does correspond to the event determination.

At block 208, if the event bit does not correspond to the event determination, then the code is encoded to generate a poison bit that corresponds to the event determination. As used herein, "encoding" refers to poisoning one or more bits of a code. As used herein, "poisoning" refers to applying a poison mask, e.g., a fixed pattern code, to store a 1-bit or a 0-bit at the event bit position to indicate the occurrence or non-occurrence of an event without changing the general effectiveness of the underlying code. Furthermore, when error checking logic is applied to the code to generate a first processed code, and to the decoded code to generate a second processed code, only one of the first processed code and the second processed code is uncorrectable. In other words, the data with additional encoding should be distinguishable, with relative ease, from the data without the additional encoding when read back from memory. This should also be the case even in the presence of common memory errors. This is explained in more detail in FIG. 3.

In embodiments of the invention, for example, a poison mask does not change the general effectiveness of the underlying error checking code if its error checking and/or correction capabilities are substantially as accurate as an error checking code that is not encoded. Furthermore, there is preferably none to little aliasing for various types of errors. For example, an error checking code that is generally effective is one in which no aliasing occurs for 1 bit or 1 wire errors, or for 2 bit errors in the same memory device; where silent data corruption (SDC) errors and detected unrecoverable errors (DUE) occur with statistical infrequency (e.g., 1 in 24 million of other two bit errors, 1 in 250 million for chipkill, respectively). In an embodiment, encoding may comprise applying a poison mask, to poison a single bit.

As one of ordinary skill in the art would understand, the logic used to encode the error checking code is dependent on the error checking code itself. As one of ordinary skill in the art would understand, generation of an error checking code, such as an ECC code, is often labor intensive work and confidential, or even trade secret data. Given the complexities of the code on which encoding is based, it is understood by one of ordinary skill in the art that the logic used to perform the additional encoding requires mathematical analysis, as well as trial and error. However, the description of the requirements that are to be satisfied will nonetheless enable those skilled in the art to generate the logic in accordance with embodiments of the invention.

For example, in an embodiment, if data has been cached (where a 1-bit indicates that data has been cached), then an error checking code of 01010100101101000 (where bit position 0 comprises the event bit to indicate whether data has been cached) would need to be encoded in accordance with the event by poisoning bit position 0 to store a 1-bit rather than a 0-bit. In this example, the encoded error checking code would result in 01010100101101001. On the other hand, if data has been cached (where a 1-bit indicates that data has been cached), then a generated error checking code of 01010100101101001 (where bit position 0 is used to indicate whether data has been cached) would not need to be encoded.

In one embodiment, event bit corresponds to a dynamic bit position to indicate that a particular processor 102N has cached data. For example, in a system with 8 processors (processors 0-7) where the caching processor 102N is processor 6, event bit corresponds to bit #7. Thus, if error checking code comprises 01010100100101000, setting a bit to indicate that processor 6 has cached data in its cache may result in error checking code 01010100101101000. Likewise, if processor #2 is caching processor, then error checking code may result in error checking code 01010100100101100. In another embodiment, event bit corresponds to a static bit to indicate that data has been cached by any one of processors, 102N. For example, if error checking code comprises 01010100100101000, and event bit comprises bit 0 to indicate that a processor has cached data, then error checking code comprises 01010100100101001 whether processor 2 or processor 7 is the caching processor.

In an embodiment, the code may comprise an error checking code. Error checking code may comprise, for example, an error correction code (ECC), or CRC (cyclic redundancy code). However, embodiments of the invention are not limited by these examples.

Figure 4:
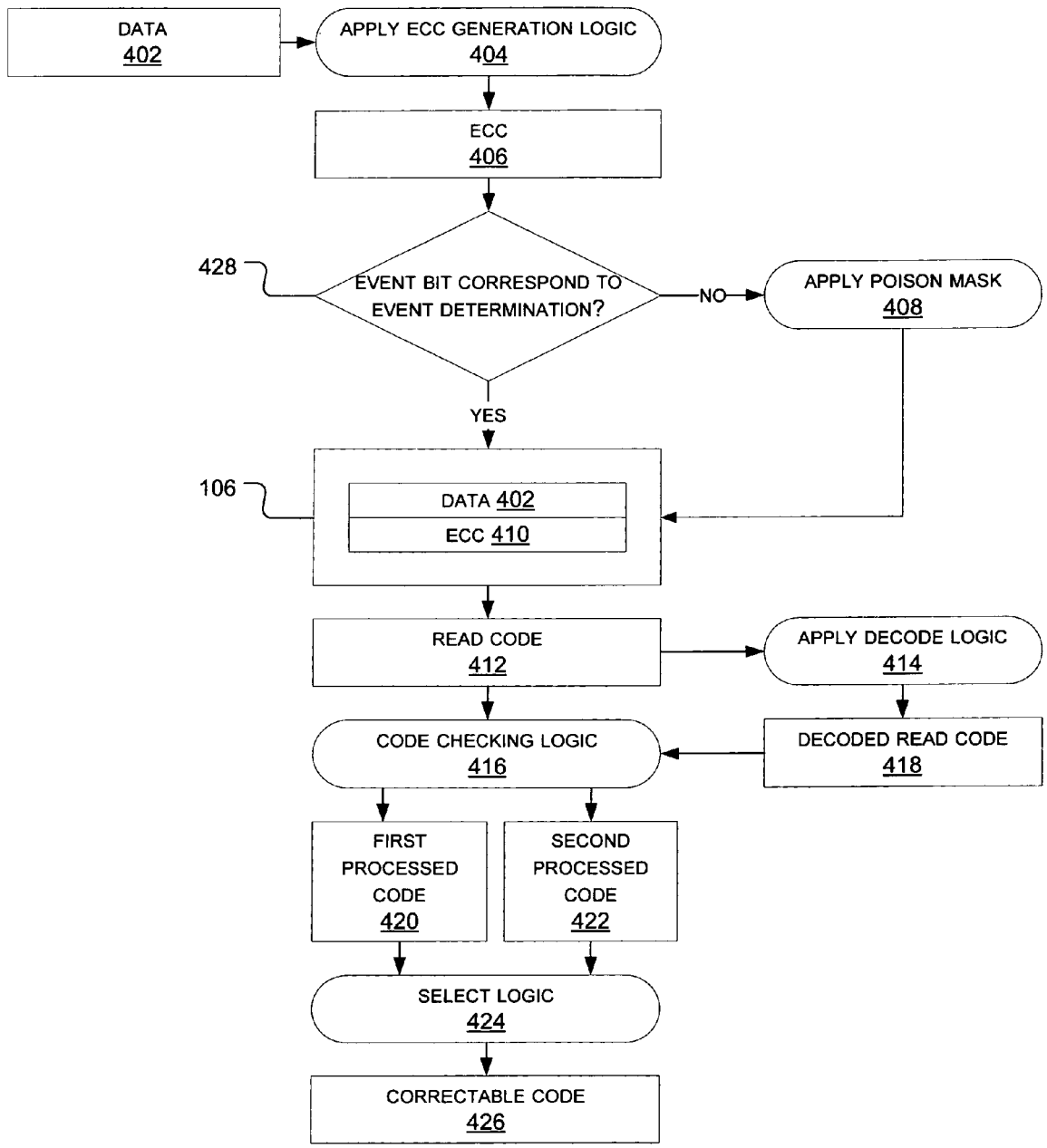
FIG. 4 illustrates a state diagram in accordance with an embodiment of the invention.

In an embodiment, the processed code may comprise an ECC code that is stored in memory along with corresponding data. For example, as illustrated in FIG. 4, once a cache line of data 402 is available to write to memory 106, ECC generation logic 404 may be applied to data 402 to generate an ECC (having an event bit) 406 that is stored with data 402 in memory 106 to correct for certain errors (e.g., 1 or 2 bit errors) that may occur during storage of data 402. As described above, and as shown by the decision block at 428, if the event bit of the ECC 406 does not correspond to the event determination, the ECC 406 is encoded using a poison mask 408. If the event bit of the ECC 406 corresponds to the event determination, then the processed code 410 is stored (without applying a poison mask at block 408) in memory 106 along with data 402.

The method of FIG. 2 may end at block 206.

In an embodiment, a cache line may be divided into a plurality of, portions, and an error checking code may be generated for each portion of the cache line. For example, a cache line may be split into two halves, and an error checking code may be generated for each half. Furthermore, encoding the error checking code may comprise applying a single mask to at least one of the cache line portions to infer a single event. Alternatively, a mask corresponding to each portion of the cache line may be applied to infer a plurality of events. Although this may result in less error correction capabilities, it may also reduce the aliasing probabilities for silent data corruption (SDC) and/or detected unrecoverable errors (DUE).

Figure 3:
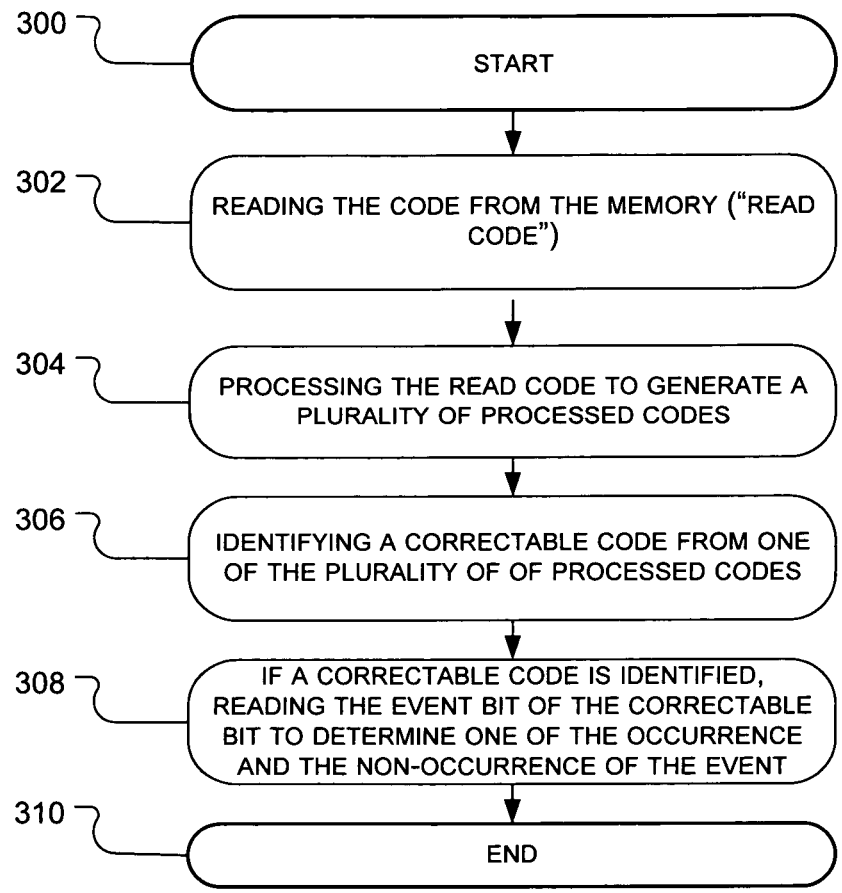
FIG. 3 illustrates a method in accordance with embodiments of the invention.

After storing error checking code in accordance with the method of FIG. 2, the method may further continue to the method of FIG. 3. The method of FIG. 3 begins at block 300 and continues to block 302 where the method may comprise reading the code from the memory ("read code"). In an embodiment, referring to FIG. 4, the method may comprise reading a processed ECC code 410 from memory 106 along with corresponding data 402.

At block 304, the method may comprise processing the read code to generate a plurality of processed codes.

In an embodiment, "processing the read code to generate a plurality of processed codes" refers to decoding the read code to generate a decoded read code, performing code checking on the read code to generate a first processed code, and performing code checking on the decoded read code to generate a second processed code. The read code refers to the encoded code that is read from the memory. The decoded read code refers to a code that results from applying an inverse of the code that that was applied to encode the code.

Referring to FIG. 4, in an embodiment, data 402 and processed ECC 410 is read from memory 106. In this respect, ECC 410 read from memory 106 is referred to as "read code".

Read code is then decoded 414 to generate decoded read code 418. Read code 412 is run through code checking logic 416 to generate a first processed code 420, and decoded read code 418 is run through code checking logic 416 to generate a second processed code 422.

Code checking logic 416 may be generated in accordance with processed code. For example, if processed ECC has been poisoned (i.e., a poison mask was applied to the ECC), then code checking logic 416 is generated such that when the processed ECC 410 is read from memory 106 (read code 412), code checking logic 416 calculated over decoded read code 418 results in no error(s) or in correctable error(s); and code checking logic 416 calculated over read code 412 results in uncorrectable error(s).

Likewise, if processed ECC has not been poisoned, then code checking logic 216 is generated such that when the processed ECC 210 is read from memory 106 (read code 212), code checking logic 216 calculated over decoded read code 218 results in uncorrectable error(s); and code checking logic 216 calculated over read code 212 results in no error(s) or in correctable error(s).

Again, it is understood by one of ordinary skill in the art that the logic used to perform the additional encoding may require mathematical analysis, as well as trial and error to make the error checking logic 216 work in this manner.

At block 306, the method may comprise identifying a correctable code from one of the plurality of processed codes. As used herein, a "correctable code" refers to one of the plurality of processed codes in which only one of the processed codes is an uncorrectable code, and the other processed code either has no error(s) or has a correctable error(s) as a result of ECC checking. If both/all processed codes result in uncorrectable errors, or both/all processed codes result in no/correctable errors, then aliasing occurs and a correctable code cannot be identified.

TABLE 1 below illustrates an example of a decision table that may be used to determine if a correctable code can be identified. In this example, Matrix A refers to ECC checking logic that is performed on the read (encoded) code; and Matrix B refers to ECC checking logic that is performed on the decoded code. The columns at the top of the table represent values for the results of a first processed code generated by performing code checking on the read (encoded) code; and the columns on the left represent the results of a second processed code generated by performing code checking on the decoded code. As the table illustrates, a code is uncorrectable in the following scenarios: if both the first processed code and the second processed have uncorrectable errors; and if both the first processed code have either no errors or correctable errors. On the other hand, a correctable code exists if one of the first processed code and the second processed code has uncorrectable errors, and the other of the first processed code and the second processed code has either no errors or correctable errors. In this latter scenario, the correctable code is processed code that has no errors or that has correctable errors.

TABLE 1

| MATRIX A → <br> ↓ MATRIX B | NO ERROR | CORRECTABLE ERROR | UNCORRECTABLE ERROR |
|---|---|---|---|
| NO ERROR | UNCORRECTABLE CODE | UNCORRECTABLE CODE | MATRIX B |
| CORRECTABLE ERROR | UNCORRECTABLE CODE | UNCORRECTABLE CODE | MATRIX B |
| UNCORRECTABLE ERROR | MATRIX A | MATRIX A | UNCORRECTABLE CODE |

Referring to FIG. 4, if one of the first processed code 420 and the second processed code 422 is uncorrectable, and the other of the first processed code 420 and the second processed code 422 is correctable (or has no errors), then a correctable code 426 may be identified by, for example, select logic 424.

At block 308, the method may comprise reading the event bit of the correctable code to determine one of the occurrence and non-occurrence of the event, if a correctable code is identified. Once a correctable code is identified, the event bit of that code may be read to determine whether the event occurred. For example, if bit value of 0 represents a non-occurrence of an event, and bit value of 1 represents an occurrence of the event, then a bit value of 0 at the event bit of the correctable code indicates that the event did not occur, whereas a bit value of 1 at the event bit of the correctable code indicates the event did occur.

The method may end at block 310.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. An apparatus to poison at least one bit, the apparatus comprising logic to: generate an ECC (error correction code) corresponding to a cache line to be stored in a shared memory, the ECC having an event bit; determine one of an occurrence and a non-occurrence of an event to generate an event determination; process the ECC code in accordance with the event bit and the event determination; store the processed ECC code and the corresponding cache line in a memory wherein the event bit corresponds to one of: a dynamic bit position to indicate that a particular processor has cached data, corresponding to the cache line, and a static bit position to indicate that any one of a plurality of processors has cached the data.

2. The apparatus of claim 1, wherein the shared memory is shared by the plurality of processors, and the corresponding cache line is requested to be stored by one processor of the plurality of processors, said logic to determine one of an occurrence and a non-occurrence of the event comprises logic to determine if the one processor additionally cached data in its local cache.

3. The apparatus of claim 1, wherein the logic to process the ECC code in accordance with the event bit and the event determination comprises logic to determine if the event bit corresponds to the event determination, and if the event bit does not correspond to the event determination, encoding the ECC to generate a poison bit that corresponds to the event determination.

4. The apparatus of claim 1, wherein the logic to process the code comprises encoding the code using a poison mask.

5. The apparatus of claim 2, additionally comprising logic to: read the ECC from the memory read code; process the read code to generate a first processed code and a second processed code; infer the occurrence of the event based, at least in part, on the first processed code and the second processed code.

6. The apparatus of claim 5, wherein said logic to process the read code to generate a first processed code and a second processed code comprises logic to decode the read code to generate a decoded read code, to perform code checking on the decoded read code, and to perform code checking on the read code.

7. The apparatus of claim 6, where said logic to decode the read code to generate a decoded read code comprises applying an inverse of the poison mask to the read code.

8. The apparatus of claim 5, wherein said logic to infer the occurrence of the event based, at least in part, on the first processed code and the second processed code comprises logic to:
identify correctable code; and
read the event bit of the correctable code to determine one of the occurrence and the non-occurrence of the event.

9. A system comprising: a plurality of processors; a shared memory coupled to the plurality of processors; and an integrated circuit coupled to the plurality of processors, and having memory controller logic to: generate an ECC (error correction code) corresponding to a cache line to be stored in a shared memory; determine one of an occurrence and a non-occurrence of an event to generate an event determination; process the ECC in accordance with the event determination; and store the processed ECC and the corresponding cache line in the memory wherein the event bit corresponds to one of: a dynamic bit position to indicate that a particular processor has cached data, corresponding to the cache line, and a static bit position to indicate that any one of a plurality of processors has cached the data.

10. The system of claim 9, wherein the corresponding cache line is requested to be stored by one processor of the plurality of processors, said memory controller logic to determine one of an occurrence and a non-occurrence of the event comprises logic to determine if the one processor additionally cached data in its local cache.

11. The system of claim 9, wherein the logic to process the ECC code in accordance with the event bit and the event determination comprises logic to determine if the event bit corresponds to the event determination, and if the event bit does not correspond to the event determination, encoding the ECC to generate a poison bit that corresponds to the event determination.

12. The system of claim 9, wherein the memory controller logic to additionally: read the code from the memory read code; process the read code to generate a plurality of processed codes; identifying a correctable code from one of the plurality of processed codes; and if a correctable code is identified, reading the event bit of the correctable code to determine one of the occurrence and non-occurrence of the event.

13. The system of claim 12, wherein said memory controller logic to process the read code to generate a plurality of processed codes comprises logic to decode the read code to generate a decoded read code, to perform code checking on the decoded read code, and to perform code checking on the read code.

14. The system of claim 13, where said logic to decode the read code to generate a decoded read code comprises applying an inverse of the poison mask to the read code.

15. A method comprising: determining one of an occurrence and a non-occurrence of an event, the one of the occurrence and the non-occurrence resulting in an event determination; and processing a code having an event bit, said processing in accordance with the determination and the code, by: determining if the event bit corresponds to the event determination; if the event, bit does not correspond to the event determination, encoding the code to generate a poison bit that corresponds to the event determination; and storing the code in a memory wherein the event bit corresponds to one of: a dynamic bit position to indicate that a particular processor has cached data, corresponding to the cache line, and a static bit position to indicate that any one of a plurality of processors has cached the data.

16. The method of claim 15, additionally comprising: reading the code from the memory read code; processing the read code to generate a plurality of processed codes; identifying a correctable code from one of the plurality of processed codes; and if a correctable code is identified, reading the event bit of the correctable code to determine one of the occurrence and the non-occurrence of the event.

17. The method of claim 16, wherein said processing the read code comprises:
- decoding the read code;
- performing code checking on read code to generate a first processed code; and
- performing code checking on the read code to generate a second processed code.

18. An article of manufacture having stored thereon instructions, the instructions when executed by a machine, result in the following: determining one of an occurrence and a non-occurrence of an event, the one of the occurrence and the non-occurrence resulting in an event determination; and processing a code having an event bit, said processing in accordance with the determination and the code, by: determining if the event bit corresponds to the event determination; if the event bit does not correspond to the event determination, encoding the code to generate a poison bit that corresponds to the event determination; and storing the code in a memory wherein the event bit corresponds to one of: a dynamic bit position to indicate that a particular processor has cached data, corresponding to the cache line, and a static bit position to indicate that, any one of a plurality of processors has cached the data.

19. The article of claim 18, additionally comprising instructions that, when executed by a machine, result in: reading the code from the memory read code; processing the read code to generate a plurality of processed codes; identifying a correctable code from one of the plurality of processed codes; and if a correctable code is identified, reading the event bit of the correctable code to determine one of the occurrence and the non-occurrence of the event.

20. The article of claim 19, wherein said instructions that result in processing the read code comprises instructions that, when executed by a machine, result in:
- decoding the read code;
- performing code checking on read code to generate a first processed code; and
- performing code checking on the read code to generate a second processed code.

* * * * *